US010360155B1

(12) United States Patent
Thomas et al.

(10) Patent No.: US 10,360,155 B1
(45) Date of Patent: Jul. 23, 2019

(54) MULTI-TIER MEMORY MANAGEMENT

(71) Applicant: Western Digital Technologies, Inc., San Jose, CA (US)

(72) Inventors: Nicholas James Thomas, Edinburgh (GB); Matthew Davidson, Los Altos, CA (US); Eran Erez, Bothell, WA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/946,387

(22) Filed: Apr. 5, 2018

(51) Int. Cl.
*G06F 12/10* (2016.01)
*G06F 3/06* (2006.01)

(52) U.S. Cl.
CPC .......... *G06F 12/10* (2013.01); *G06F 3/0611* (2013.01); *G06F 3/0647* (2013.01); *G06F 3/0688* (2013.01); *G06F 2212/1024* (2013.01); *G06F 2212/202* (2013.01); *G06F 2212/657* (2013.01)

(58) Field of Classification Search
None
See application file for complete search history.

(56) References Cited

U.S. PATENT DOCUMENTS

| 8,782,369 | B2 | 7/2014 | Baderdinni et al. |
| 8,788,778 | B1 | 7/2014 | Boyle |
| 9,274,941 | B1 | 3/2016 | Throop et al. |
| 9,323,655 | B1 | 4/2016 | Sahin et al. |
| 9,430,376 | B2 | 8/2016 | Horn |
| 2015/0261439 | A1 | 9/2015 | Kumar et al. |
| 2016/0147797 | A1 | 5/2016 | Dolph et al. |

OTHER PUBLICATIONS

Kim et al, "How could a flash cache degrade database performance rather than improve it? Lessons to be learnt from multi-tiered storage"; 2nd Workshop on Interactions of NVM/Flash with Operating Systems and Workloads; 2014; https://www.usenix.org/system/files/conference/inflow14/inflow14-kim.pdf; 9 pages.

*Primary Examiner* — Kevin Verbrugge
(74) *Attorney, Agent, or Firm* — Loza & Loza, LLP; Gabriel Fitch

(57) ABSTRACT

The disclosure relates in some aspects to managing multi-tier memory, such as multi-tier NVM. Data that is originally written to a first tier (e.g., a fast tier) may be subsequently copied to a second tier (e.g., a slow tier). The data is temporarily left in the first tier until the space is needed for a subsequent write operation. Thus, for a period of time, a read operation is able to read the data from the first tier (e.g., the fast tier) instead of the second tier (e.g., the slow tier), thereby improving read performance. The disclosure relates in some aspects to a memory mapping scheme that enables a read operation to readily determine that data remains in the first tier and locate the data in that tier. Moreover, the scheme enables efficient reconfiguration of the mapping when the data in the first tier is erased.

30 Claims, 11 Drawing Sheets

MULTI-TIER MEMORY MANAGEMENT

FIELD

The disclosure relates, in some embodiments, to non-volatile memory (NVM) devices and memory controllers for use therewith. More specifically, but not exclusively, the disclosure relates to managing multi-tier NVM memory.

INTRODUCTION

Solid state data storage devices (hereafter referred to as SSD storage devices) incorporating non-volatile memories (NVMs), such as flash NAND memories, are replacing or supplementing conventional rotating hard disk drives for mass storage in many consumer or industrial electronics and computers. In a typical SSD storage device-based product, a host computing device includes or communicates with an NVM device controller for accessing one or more NVM memory devices.

SSD storage devices may include multiple tiers of storage, where different tiers may have different performance characteristics, endurance characteristics, and costs. Current SSD storage devices can include a single-level cell (SLC) layer and a triple-level cell (TLC) layer and/or other types of layers. To improve the memory performance (e.g., write speed), a device controller may write incoming data to a higher-performance tier (e.g., SLC) and subsequently relocate the data to a lower-performance tier (e.g., TLC). This operation may be equivalently referred to as relocation, migration, or evacuation.

Relocation from one tier to another may be guided by a policy set within the device controller. In some scenarios, a device controller may use a so-called lazy policy to relocate data which involves only moving data from a high-performance tier to a low-performance tier on demand, optimizing for localized read of hot data. In other scenarios, a device controller may use a so-called greedy algorithm to aggressively move data to a low-performance tier in an attempt to ensure as high of write performance as possible, at the expense of read performance for data which was relocated.

Relocation may be triggered during an idle time for an SSD storage device. Idle time may refer to, for example, a time when the NVM is not actively servicing read commands, write commands, etc. (e.g., so-called garbage collection operations may typically be performed during idle time). In this way, write or read performance is not adversely affected by relocation accesses of the NVM. Some relocation policies may attempt to completely (or mostly) clear the highest tier during idle time. Some relocation policies may perform a minimal relocation during idle time to allow for acceleration of short bursts of future write activity.

From the above, it should be appreciated that there are performance tradeoffs associated with these different relocation policies. It would be advantageous to provide a relocation policy that provides the best possible performance.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a method of controlling data storage. In one example, the method comprises: copying data from a block of a first type of non-volatile memory to a block of a second type of non-volatile memory, wherein a cell of the second type of non-volatile memory is configured to store more information than a cell of the first type of non-volatile memory; modifying a first memory map to include a mapping of a logical block address to the block of the second type of non-volatile memory; modifying a second memory map to include a mapping of the block of the second type of non-volatile memory to the block of the first type of non-volatile memory; and setting an indication to indicate that the data remains in the block of the first type of non-volatile memory.

One embodiment of the disclosure provides an apparatus for controlling data storage that comprises: a first type of non-volatile memory; a second type of non-volatile memory; and a processor coupled to the first type of non-volatile memory and the second type of non-volatile memory. In one example, the processor is configured to: copy data from a block of the first type of non-volatile memory to a block of the second type of non-volatile memory, wherein a cell of the second type of non-volatile memory is configured to store more information than a cell of the first type of non-volatile memory; modify a first memory map to include a mapping of a logical block address to the block of the second type of non-volatile memory; modify a second memory map to include a mapping of the block of the second type of non-volatile memory to the block of the first type of non-volatile memory; and set an indication to indicate that the data remains in the block of the first type of non-volatile memory.

One embodiment of the disclosure provides an apparatus for controlling data storage. In one example, the apparatus comprises: means for copying data from a block of a first type of non-volatile memory to a block of a second type of non-volatile memory, wherein a cell of the second type of non-volatile memory is configured to store more information than a cell of the first type of non-volatile memory; means for modifying a first memory map to include a mapping of a logical block address to the block of the second type of non-volatile memory; means for modifying a second memory map to include a mapping of the block of the second type of non-volatile memory to the block of the first type of non-volatile memory; and means for setting an indication to indicate that the data remains in the block of the first type of non-volatile memory.

One embodiment of the disclosure provides a non-transitory computer-readable medium storing computer-executable code for controlling data storage. In one example, the computer-readable medium comprises code to: copy data from a block of a first type of non-volatile memory to a block of a second type of non-volatile memory, wherein a cell of the second type of non-volatile memory is configured to store more information than a cell of the first type of non-volatile memory; modify a first memory map to include a mapping of a logical block address to the block of the second type of non-volatile memory; modify a second memory map to include a mapping of the block of the second type of non-volatile memory to the block of the first type of non-volatile memory; and set an indication to indicate that the data remains in the block of the first type of non-volatile memory.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
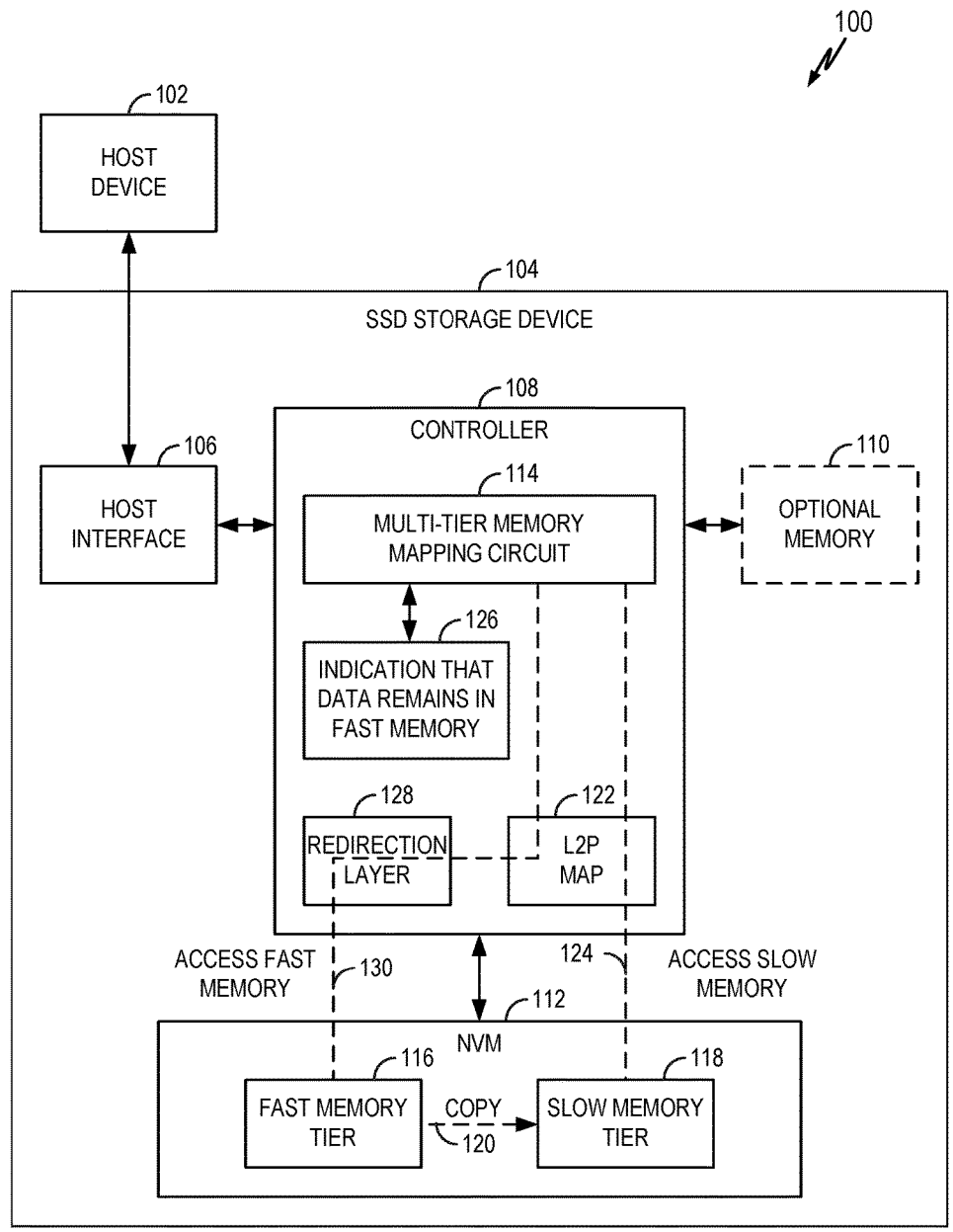
FIG. 1 illustrates an example memory system including an SSD storage device configured in accordance with one or more aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The disclosure relates in some aspects to various apparatuses, systems, methods, and media for managing multi-tier memory, particularly multi-tier NVM devices. Data that is originally written to a first memory tier (e.g., a relatively faster tier including SLC technology) may be subsequently copied to a second memory tier (e.g., a relatively slower tier including TLC technology). Rather than immediately erasing the data from the first memory tier to free up space in this tier, the data is temporarily left in the first memory tier in an attempt to improve read performance. For example, the data may remain in the first memory tier until the space is needed for a subsequent write operation. Thus, for a period of time, a read operation is able to read the data from the first memory tier (e.g., the fast tier) instead of the second memory tier (e.g., the slow tier). The disclosure relates in some aspects to a memory mapping scheme that enables a read operation to determine that data remains in the first memory tier and locate the data in that memory tier. Moreover, the scheme enables efficient reconfiguration of the mapping when the data in the first tier is erased. For example, the memory mapping for a particular block of data may be readily erased, without significantly impacting the ability of the system to efficiently free up the first memory tier for future write operations.

For purposes of illustration, various aspects of the disclosure will be described in the context of a memory system that includes NAND memory technology. A NAND may also be referred to herein as a NAND Flash memory, a NAND memory device, a NAND flash, or a NAND device. Generally speaking, a NAND device is a non-volatile memory having high storage density, fast access time, low power requirements in operation and advantageous shock resistance, compared to more conventional memory platforms. Raw NAND devices may be equipped (e.g., configured) with a serial interface such as Open NAND Flash Interface (ONFi), Common Flash Memory Interface (CFI), and the like. NAND devices may be configured as discrete memory chips or packaged with a controller to form a secure digital (SD) memory card, Multi Media Card (MMC), or a solid state disk. A NAND device may be configured with a single flash die, or a plurality of dies. In addition to memory cells, a NAND device may include other components, such as control/address logic components, I/O components, and data register components. It should be appreciated that the teachings herein are also applicable to other forms of memory (e.g., NVM other than NAND devices).

Memory in an NVM-based product may be logically divided into blocks, and each of the blocks may be further logically divided into addressable pages. These addressable pages may be any of a variety of sizes (e.g., 512 Bytes, 1 Kilobytes, 2 Kilobytes, 4 Kilobytes), which may or may not match the logical block address sizes used by a host computing device.

Conventional NVM devices or similar storage devices may employ tiered memory primarily in an effort to improve write performance. The first tier tends to be smaller, but faster to write. Each additional tier is larger, but slower to write. To maintain the benefit of the faster tiers, data is moved from the fast tiers to the slower tiers during idle times of the memory device (e.g., an SSD drive). This creates more space for future host writes at the fastest possible speed.

Faster tiers for writing also tend to be faster tiers for reading. Therefore, preserving data in the fast tier(s) improves the read performance of that data (in particular, the performance of random reads may be improved). However, this performance gain (of subsequent reads) is not achieved in conventional storage devices that move the data from the fast tiers to the slow tiers during idle time. Thus, there is a trade-off between moving the data to slow tiers, to improve write performance, versus not moving the data to improve read performance. However, it is not generally known whether the subsequent workload will be read-intensive or write-intensive. Thus, there is no guarantee that a decision to move a particular set of data will result in the best performance for subsequent reads and writes.

The disclosure relates in some aspects to mitigating the above uncertainty involved in determining the timing and magnitude of the idle data relocation by preserving both copies of the data as long as possible. Since the space created in the fast tier only needs to be reallocated when the fast tier is almost full and there is a pending write operation, the blocks that have been relocated from the fast tier need not be erased until this time, allowing any data that has been copied from these blocks to still be read from the fast tier.

Thus, the disclosure also relates in some aspects to managing the physical addressing of one logical address to two different locations. Here, two copies of data are stored in different memory tiers (one copy of the data being transient in nature). For the duration of time that both copies exist, either copy may be accessed in response to a request for the data (typically, the copy in the fastest tier will be accessed). To enable efficient access to the different locations, a mapping table is used to point to the most recently written copy of all data, and at least one secondary mapping structure is maintained to allow the less recently created copy to be accessed while (and only while) this copy is still in existence. In general, the mapping table is updated (to enable access to both the fast tier location and the slow tier location) when the relocation from the fast tier to the slow tier occurs in idle time. If the relocation instead occurred as a result of an immediate need for space in the fast tier, then the system would simply erase the appropriate block in the fast tier after the data is relocated to the slow tier (e.g., via a foreground operation).

Solid state data storage devices use a logical to physical (L2P) table to maintain a mapping between logical memory addresses (e.g., used by the host computing device) and physical memory addresses (e.g., of the NVM device(s)). Each entry of an L2P table may include mapping information for one host logical page. In one example, a logical page size is 4 Kilobytes (4 KB) with the corresponding entry size in the L2P table being 4 bytes. For a 16 Terabyte (TB) SSD storage device, the L2P table size would therefore be 16 Gigabytes (GB) in this example. This aspect of the mapping scheme remains unchanged in an apparatus constructed according to the teachings herein. As in conventional memory systems, the main L2P mapping is updated as data is moved from the fast tier to the slow tier.

The disclosed memory mapping scheme includes at least one additional mapping table (e.g., of equivalent size to the number of fast tier physical locations) to map from the slow tier to the fast tier. This table is divided into units each referencing the physical blocks being filled in the slow tier. For convenience, this map may be referred to as a P2OldP table herein (i.e., new Physical address to Old Physical address).

In some embodiments, two additional block-granularity structures provide a redirection layer. The redirection layer includes a mapping of a fast tier block to a slow tier block (an F2S structure), as well as the reverse mapping of a slow tier block to a fast tier block (an S2F structure). In some embodiments, these structures may be many magnitudes smaller in size than the L2P structure and the P2OldP table. Since not all blocks in the slow tier map back to previous locations of data in the fast tier, the S2F structure is sparse. Furthermore there may be many fast tier blocks that map to a single slow tier block. In other words, many partially valid source blocks may be relocated to a single destination block. Due to these factors, it is more efficient in mapping space (but not essential) and therefore recommended to treat the S2F structure as two separate structures: 1) a sparse S2F structure; and 2) a bitmap indicating presence of a given slow tier block within the sparse S2F structure. In some implementation, a controller may search within the sparse S2F structure for the entry for a given slow tier block rather than using direct indexing.

During relocation, when data is being copied into a block in the slow tier, an unused unit of the P2OldP table is allocated to this block. In addition, an entry is assigned to a block in the S2F structure. For each physical offset written in the slow tier block during this relocation, the physical location of the source (in the fast tier) is noted within the P2OldP table. This process continues during the idle-time relocation. Each new fast tier source selected during this process is added to the entry of the S2F structure. In addition, the physical offset within the slow tier block to which the data from the first entry for this new source is noted. Similarly, the reverse mapping is noted in the appropriate entry in the F2S structure.

With the S2F and F2S structures in place, any fast tier location (preserved in the P2OldP table) of data already moved to the slow tier (with mapping in the L2P table) may be found by checking whether an entry exists for the slow tier block in the S2F structure. If this entry exists, the P2OldP table may be directly accessed at the appropriate entry and offset (the offset is given by the physical offset of the translation in the L2P table).

In some embodiments, in the event that a fast tier block is to be erased, the P2OldP entries mapping to it are erased. This may be relatively burdensome, however. As an alternatively, only the offset ranges within the S2F structure entry may be erased. This means that the P2OldP table is dereferenced over the range previously pointed to in the erased fast tier block. The F2S structure is used during the erase processing to determine which slow tier block(s) contain data from the about-to-be-erased fast tier block. Once this is determined and the appropriate S2F entries are modified, the corresponding F2S entry is erased.

In some embodiments, the size of the P2OldP entries may be reduced by stripping out the fast tier block ID since the block IDs covering given ranges within the P2OldP table may be stored in the S2F entry. In effect this means the P2OldP table need only store the offset within the fast tier block.

The sparse S2F structure is capable of holding multiple source block IDs for each entry—the maximum size per entry being the number of blocks within the fast tier. However, the total maximum size for the entire S2F table is only a little larger than the number of blocks within the fast tier (a little larger since some fast tier block may have been copied to two different slow tier blocks). Thus, in some embodiments, linked lists are used for the S2F structure to reduce the amount of memory needed for this structure.

In view of the above, the disclosed memory mapping scheme enables data to be read from the fast tier, even though the data has already been copied (and mapped) to the slow tier. In addition, this memory mapping scheme allows compaction of data as the data is moved from the fast tier to the slow tier. This reduces write amplification (write delay) in the slow tier layer. Moreover, the disclosed scheme does not require batch processing of a large number of mapping table updates when a fast tier block is erased or a complicated phasing scheme to manage changes to the mapping table when such a block is erased. The disclosed scheme does not add any further burden to the garbage collection algorithm since old locations in the fast tier are treated as being entirely invalid. Moreover, the scheme is inherently power-loss safe, since the additional structures are not required to preserve the latest copy of the data. Therefore, the additional structures need not be preserved in non-volatile memory. Also, the disclosed scheme uses an already written copy of the data in the fast tier, rather than creating a new copy within the fast tier (which could be more costly in write amplification to the fast tier, and would also involve the use of a more complex algorithmic to implement). The above aspects and other aspects of the disclosure will now be described in more detail in conjunction with FIGS. 1-6.

Example Memory System

FIG. 1 illustrates an embodiment of an memory system 100 that includes a host device 102 (e.g., a host computer) and an SSD storage device 104 coupled to the host device 102. The host device 102 provides commands to the SSD storage device 104 for transferring data between the host device 102 and the SSD storage device 104. For example, the host device 102 may provide a write command to the SSD storage device 104 for writing data to the SSD storage device 104 or read command to the SSD storage device 104 for reading data from the SSD storage device 104. The host device 102 may be any system or device having a need for data storage or retrieval and a compatible interface for communicating with the SSD storage device 104. For example, the host device 102 may a computing device, a personal computer, a portable computer, or workstation, a server, a personal digital assistant, a digital camera, a digital phone, or the like.

The SSD storage device 104 includes a host interface 106, a controller 108, an optional memory 110, and an NVM 112. The host interface 106 is coupled to the controller 108 and facilitates communication between the host device 102 and the controller 108. Additionally, the controller 108 is coupled to the memory 110 and the non-volatile memory 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host device 102 includes the SSD storage device 104 (e.g., the host device 102 and the SSD storage device 104 are implemented as a single component). In other embodiments, the SSD storage device 104 is remote with respect to the host device 102 or is contained in a remote computing system coupled in communication with the host device 102. For example, the host device 102 may communicate with the SSD storage device 104 through a wireless communication link.

The controller 108 controls operation of the SSD storage device 104. In various embodiments, the controller 108 receives commands from the host device 102 through the host interface 106 and performs the commands to transfer data between the host device 102 and the non-volatile memory 112. The controller 108 may include any type of processing device, such as a microprocessor, a microcontroller, an embedded controller, a logic circuit, software, firmware, or the like, for controlling operation of the SSD storage device 104.

In some embodiments, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. In some embodiments, one or more of the functions described herein as being performed by the controller 108 are instead performed by the host device 102. In some embodiments, some or all of the functions described herein as being performed by the controller 108 may instead be performed by another element such as a controller in a hybrid drive including both non-volatile memory elements and magnetic storage elements.

The memory 110 may be any memory, computing device, or system capable of storing data. For example, the memory 110 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host device 102 and the non-volatile memory 112. For example, the memory 110 or a portion of the memory 110 may be a cache memory.

The controller 108 and/or the NVM 112 can be configured to manage multi-tier memory as described herein. For example, as shown in FIG. 1, the controller 108 includes a multi-tier memory mapping circuit 114 for managing accesses of a fast memory tier 116 and a slow memory tier 118 of the NVM 112. Other embodiments may include a different number of memory tiers and/or different types of memory tiers.

In response to a write issued by the host device 102, the multi-tier memory mapping circuit 114 may initially write data to a block of the fast memory tier 116 and then copy 120 the data to a block of the slow memory tier 118. In conjunction with copying the data to the slow memory tier 118, the multi-tier memory mapping circuit 114 configures an L2P map 122 to enable a subsequent access 124 of the data in the slow memory tier 118. In accordance with the teachings herein, the multi-tier memory mapping circuit 114 sets an indication 126 that the data remains in the fast memory tier 116 and configures a redirection layer 128 that maps the block of the fast memory tier 116 to the block of the slow memory tier 118, and vice versa. For purposes of illustration, the L2P map 122, the indication 126, and the redirection layer 128 are depicted in FIG. 1 as being separate from (e.g., external to) the multi-tier memory mapping circuit 114. In different embodiments, some or all of this information may be stored in the multi-tier memory mapping circuit 114, a memory external to the multi-tier memory mapping circuit 114, a memory external to the controller 108 (e.g., the memory 110), or any combination thereof.

In response to a read subsequently issued by the host device 102, the multi-tier memory mapping circuit 114 uses the L2P map 122 to determine which block of the slow memory tier 118 holds the data. The multi-tier memory mapping circuit 114 then checks the indication 126 for that block to determine whether the data is still in the fast memory tier 116. If so, the multi-tier memory mapping circuit 114 uses the redirection layer 128 to access 130 the data in the fast tier memory 116.

At some point in time, the block of the fast memory tier 116 that holds the data may need to be erased (e.g., the block is needed for a write issued by the host device 102). In this case, the multi-tier memory mapping circuit 114 deletes the indication 126 and the entries in the redirection layer 128 for the data. The controller 108 then erases the block of the fast memory tier 116.

Example Multi-Tier Mapping

Figure 2:
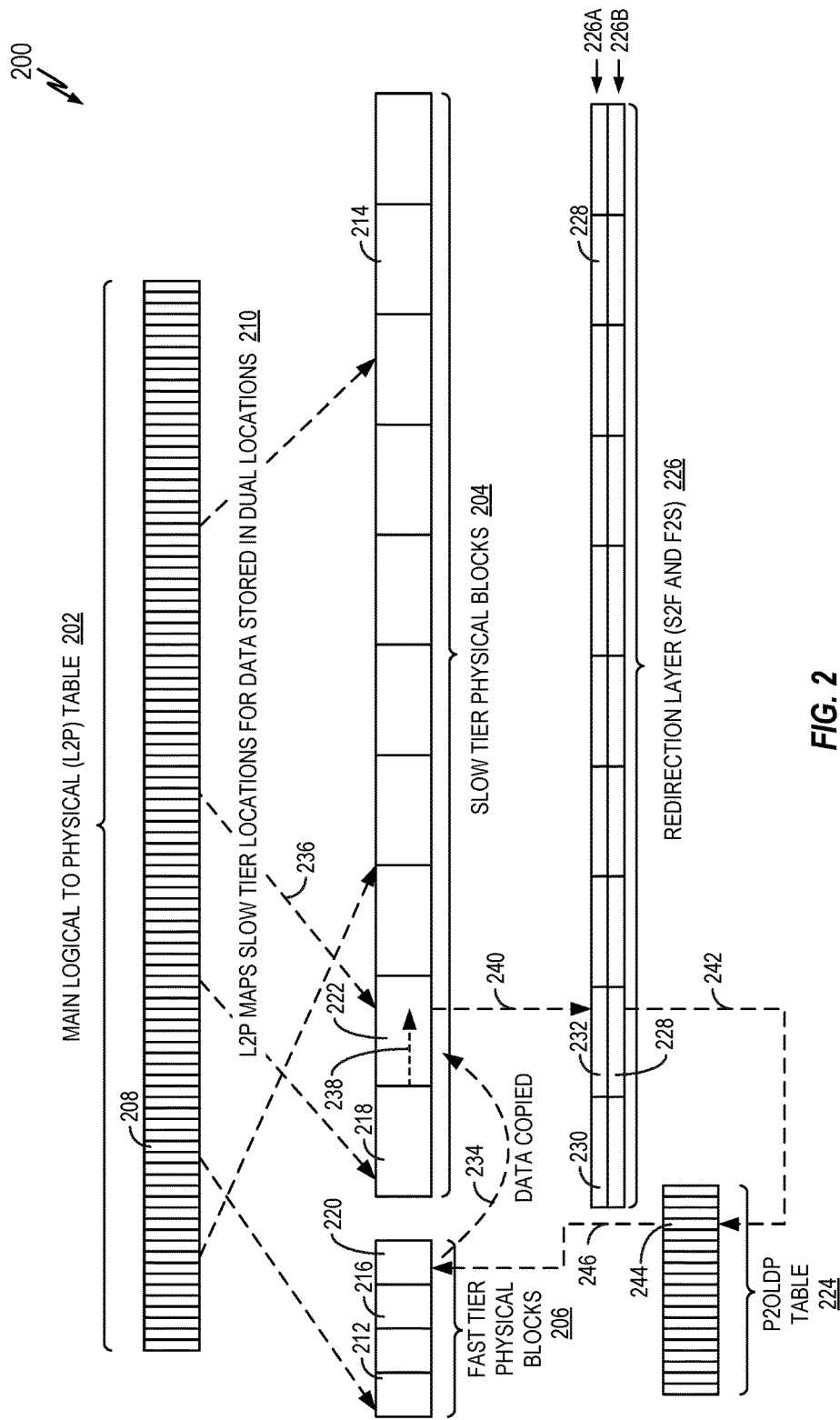
FIG. 2 illustrates an example memory mapping scheme in accordance with one or more aspects of the disclosure.

FIG. 2 illustrates an embodiment of a memory mapping scheme 200 for a multi-tier memory. The memory mapping scheme 200 includes a main L2P table 202 that maps each logical block address (e.g., the address used by a host for a read or a write) to a physical block address at which the data is stored. As discussed herein, data may be stored in a slow tier 204 and/or in a fast tier 206. In some implementations, the size of the blocks (e.g., a block 208) addressed by the L2P table 202 depends on the block size for the underlying memory technology (e.g., 4 Kbytes for NAND devices). Other block sizes may be used in other embodiments.

Initially, data may be written to the fast tier 206 to improve write performance. As one example, the fast tier 206 may be a cache (e.g., implemented using SLC technology). Thus, the L2P table 202 initially maps the corresponding logical block address to a physical block address in the fast tier 206. During idle, data may be copied to the slow tier 204. Typically, the slow tier 204 is a larger and less expensive memory (e.g., implemented using TLC technology). For example, the slow tier 204 may be capable of storing more data in one of its memory cells than the fast tier 206 is able to store in one of its memory cells. Once the data is copied from the fast tier 206 to the slow tier 204, the L2P table 202 is updated to map 210 the corresponding logical block address to a physical block address in the slow tier 204.

Data is moved between the fast tier 206 and the slow tier 204 in larger blocks to improve the efficiency of the data transfer. For example, the size of blocks (e.g., a block 212) defined for the fast tier 206 may correspond to the size of an erasure unit for the underlying memory technology (e.g., SLC technology). This block size may be much larger than the block size for the L2P table 202. In addition, the size of blocks (e.g., a block 214) defined for the slow tier 204 may be larger still (e.g., 10s of Mbytes or 100s of Mbytes) since this enable more efficient operation as the data may be stored in parallel across multiple dies.

In the example of FIG. 2, data from a fast tier block 216 is copied to a slow tier block 218 and data from a fast tier block 220 is copied to a slow tier block 222. In some embodiments, only valid data is copied from the fast tier 206 to the slow tier 204 to reduce the amount of time that is spent copying data between tiers. Thus, data may be compacted as it is copied into the slow tier 204.

The memory mapping scheme 200 includes a P2OldP table 224 that provides a pointer to a data location in the fast tier 206 that holds data that has been copied to the slow tier 204. The granularity (e.g., the mapped block size) of the P2OldP table 224 corresponds to the block size of the L2P table 202 (e.g., 4 Kbytes). The P2OldP table 224 includes an entry for every corresponding block (e.g., 4 Kbyte block) of data in the fast tier 206. The entries of the P2OldP table 224 index in the physical domain of the blocks of the slow tier 204 as discussed in more detail below.

Since the P2OldP table 224 maps to the smaller fast tier 206 instead of the entire address space of the slow tier 204, the memory mapping scheme 200 includes a redirection layer 226 that remaps the full slow tier physical domain to the fast tier-sized P2OldP table 224, and vice versa. The redirection layer 226 includes a slow-to-fast (S2F) structure 226A for mapping from each slow tier block to each fast tier block. In addition, the redirection layer includes a fast-to-slow (F2S) structure 226B for mapping from each fast tier block to each slow tier block. The number of entries (e.g., an entry 228) in each structure may correspond to the number of large blocks defined for the slow tier 204 (e.g., 10 blocks). For example, an S2F entry 230 may hold redirection information for the slow tier block 218, while an S2F entry 232 may hold redirection information for the slow tier block 222.

An example of the redirection flow for a read operation that is performed in response to a read command follows. Prior to receiving the read command, valid data has already been copied 234 from the block 220 to the block 222 and the appropriate mappings have been made. The read operation is directed to a particular logical address that is mapped 236 by the L2P table 202 to a physical address in the slow tier 204. This physical address corresponds to a particular block (the slow tier block 222 in this example) and a particular offset into the block (an offset 238 in this example). The S2F entry 232 corresponding 240 to the slow tier block 222 maps 242 the slow tier block 222 and the offset 238 to a particular entry 244 in the P2OldP table 224. The entry 244 points 246 to a location in the fast tier block 220 (e.g., an offset into the fast tier block 220) that holds the data of interest. The data may thus be read from this location in the fast tier 206, rather than from the slow tier 204.

These and other aspects of the use of a multi-tier mapping in accordance with the teachings herein will now be described in more detail in conjunction with FIGS. 2-4.

Example Write and Mapping Operations

Figure 3:
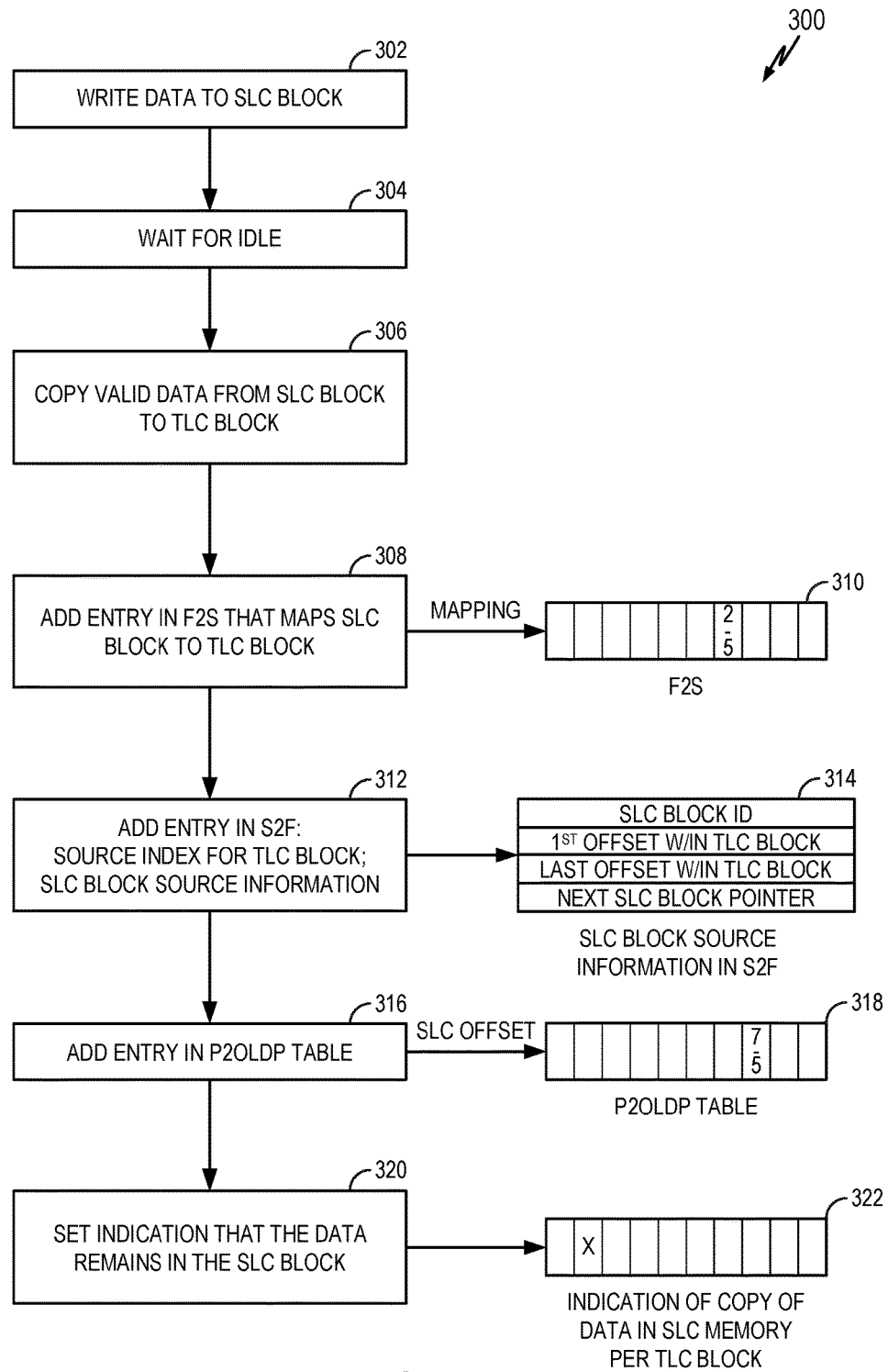
FIG. 3 illustrates an example relocation operation in accordance with one or more aspects of the disclosure.

FIG. 3 illustrates an embodiment of operations 300 that may be performed in conjunction with storing data and setting up multi-tier mapping as in the example of FIG. 2. For purposes of illustration, the slow tier blocks and the fast tier bocks of FIG. 2 may be referred to as SLC blocks and TLC blocks, respectively, in the discussion of FIG. 3 that follows. The operations 300 may take place within a processing circuit (e.g., the processing circuit 710 of FIG. 7), which may be located in a controller, an SSD storage device, an SSD drive, a host device, or some other suitable apparatus.

At block 302, an apparatus (e.g., a controller) writes data to an SLC block. For example, the apparatus may write data to the fast tier block 220 of FIG. 2.

At block 304, the apparatus waits for an idle time to begin background operations. For example, the controller may wait until the NVM is not servicing any write requests, read requests, or other high priority tasks.

At block 306, during the idle time, the apparatus copies valid data from an SLC block to one or more TLC blocks. For example, the apparatus may copy valid data from the fast tier block 220 to the slow tier block 222 of FIG. 2. Since the copy operation involves compaction, data from multiple SLC blocks (e.g., the fast tier blocks 216 and 220) could be written to a single TLC block (e.g., the slow tier block 222).

At block 308, the apparatus adds an entry to the F2S structure that maps the SLC block to the TLC block. For example, this entry may map the fast tier block 220 to the slow tier block 222 of FIG. 2. FIG. 3 includes a simplified example of an F2S structure 310. The F2S structure 310 may correspond the entry 232 of FIG. 2.

At block 312, the apparatus adds an entry to the S2F structure that maps the TLC block and offset to the P2OldP table. For example, this entry may include a source index for the TLC block (not shown in FIG. 3), and SLC block source information per TLC block. FIG. 3 includes a simplified example of SLC block source information 314 for a particular TLC block in the S2F structure. This S2F structure may correspond the entry 232 of FIG. 2. As indicated, the SLC block source information 314 identifies the SLC block that originally stored the data, a first offset within the TLC block at which copied data is stored, a last offset within the TLC block at which copied data is stored, and a pointer to the next entry in the linked list. As discussed below, this information is used during a read operation determine an offset into the P2OldP table that indicates where the data is stored in the SLC block.

At block 316, the apparatus adds an entry in the P2OldP table that points to the corresponding data stored in the SLC block. For example, referring to FIG. 2, this entry may map the slow tier block 222 and offset 236 to the fast tier block 220 and a corresponding offset. FIG. 3 includes a simplified example of a P2OldP table 318. The P2OldP table 318 may correspond the P2OldP table 224 of FIG. 2.

At block 320, the apparatus sets an indication (e.g., in the S2F structure) that indicates that data stored in the corresponding TLC block remains in the original SLC block. For example, referring to FIG. 2, this indication may indicate that data copied to the slow tier block 222 remains in the fast tier block 220. FIG. 3 includes a simplified example of a structure 322 that includes an indication entry (e.g., a bit) for each TLC block.

Example Read Operations

Figure 4:
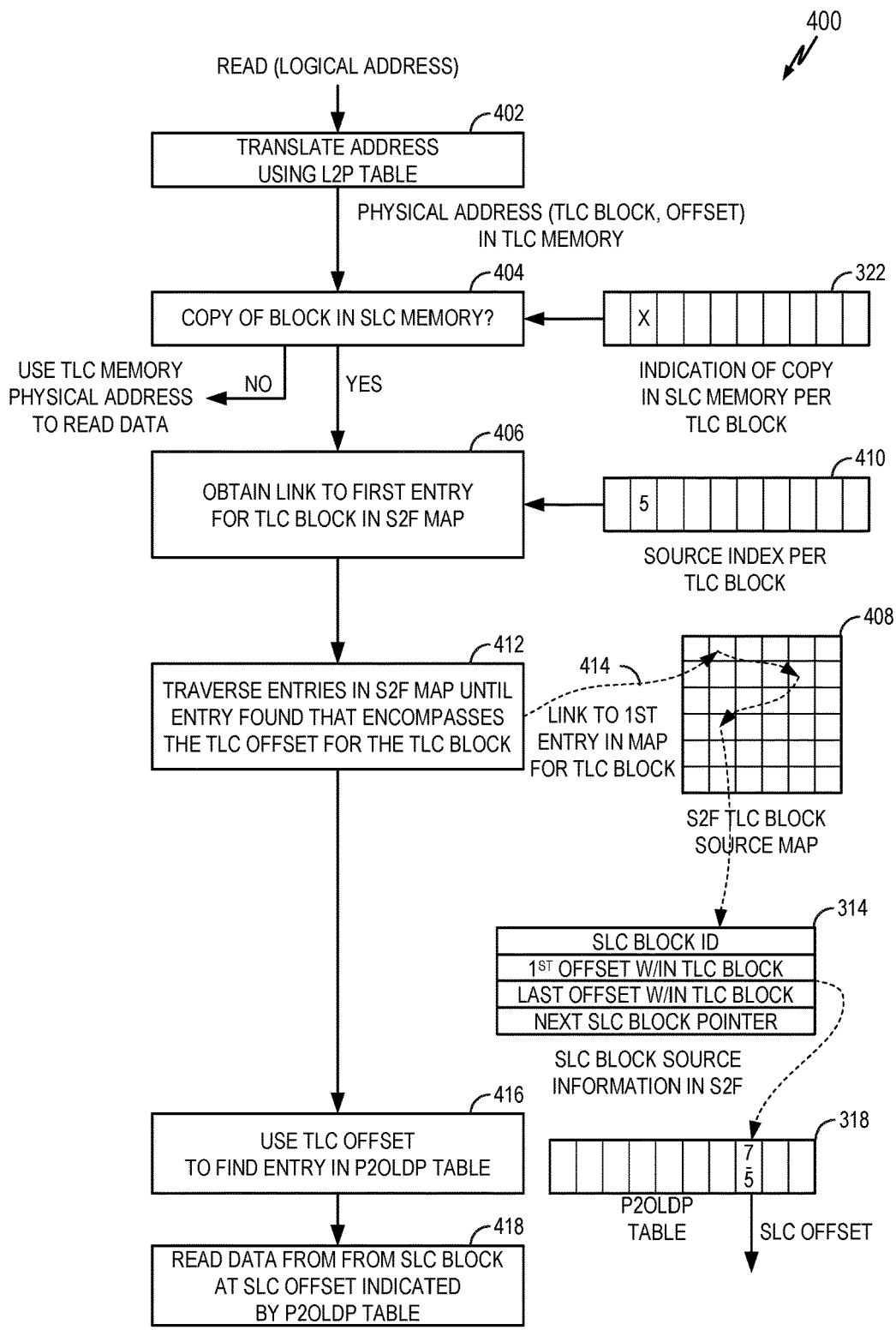
FIG. 4 illustrates an example read operation in accordance with one or more aspects of the disclosure.

FIG. 4 illustrates an embodiment of operations 400 that may be performed in conjunction with reading data from that was stored in a multi-tier memory as in the example of FIG. 3. The operations 400 may take place within a processing circuit (e.g., the processing circuit 710 of FIG. 7), which may be located in a controller, an SSD storage device, an SSD drive, a host device, or some other suitable apparatus.

At block 402, an apparatus (e.g., a controller) receives a read request directed to a particular logical address and uses the L2P table to translate the physical address to a physical address in TLC memory. This physical address corresponds to a particular TLC block and a particular offset in that TLC block. For example, the physical address may correspond to the slow tier block 222 and the offset 236 of FIG. 2.

At block 404, the apparatus determines whether a copy of this data remains in SLC memory. For example, the apparatus may read the indication for the TLC block identified at block 402 from the structure 322 that was set for this TLC block as described at block 320 of FIG. 3.

If a copy of this data is not in SLC memory (e.g., the indication is not set), the apparatus reads the data from the TLC memory physical address. Thus, the P2OldP table and the rest of the redirection layer are not used in this scenario.

If, however, a copy of this data does remain in SLC memory (e.g., the indication is set), the apparatus will use the P2OldP table and the redirection layer to locate the data in the SLC memory. The operation 400 proceeds to block 406 in this scenario.

At block 406, the apparatus obtains a link to the first entry for the TLC block in an S2F map 408. To this end, the apparatus may obtain the source index for this TLC block from the S2F structure. FIG. 4 illustrates a simplified example of a structure 410 that includes a source index entry for each TLC block.

At block 412, starting at the link to the first entry 414 for the TLC block in the S2F map 408, the apparatus traverses the S2F map 408 until the entry that encompasses the TLC offset for the TLC block is found. Here, a given entry in the S2F map 408 corresponds to the SLC block source information 314 described at block 312 of FIG. 3 and reproduced in FIG. 4 for convenient reference. If the TLC offset of interest is within the range of the first entry in the S2F map 408 (e.g., the TLC offset is within the range specified by the first offset and the last offset in the SLC block source information 314), the SLC block indicated by the first entry contains the data of interest. If the TLC offset is not within the offset range of the first entry in the S2F map 408, the apparatus checks the next entry in the S2F map 408 pointed to by the "next" pointer in the first entry. This process continues until the appropriate entry in the S2F map 408 (e.g., the appropriate entry in the SLC block source information 314) is found.

At block 416, the apparatus can therefore use the TLC offset to find the entry in the P2OldP table 318 that points to the data in the SLC memory. For example, the entry in the P2OldP table 318 may include an offset into the SLC block indicated by the SLC block ID field of the SLC block source information for the TLC block.

At block 418, the apparatus read the data from the SLC block at the SLC offset indicated by the P2OldP table 318. In the example of FIG. 2, the apparatus may read the data from the slow tier block 220.

Example Erase Operations

Figure 5:
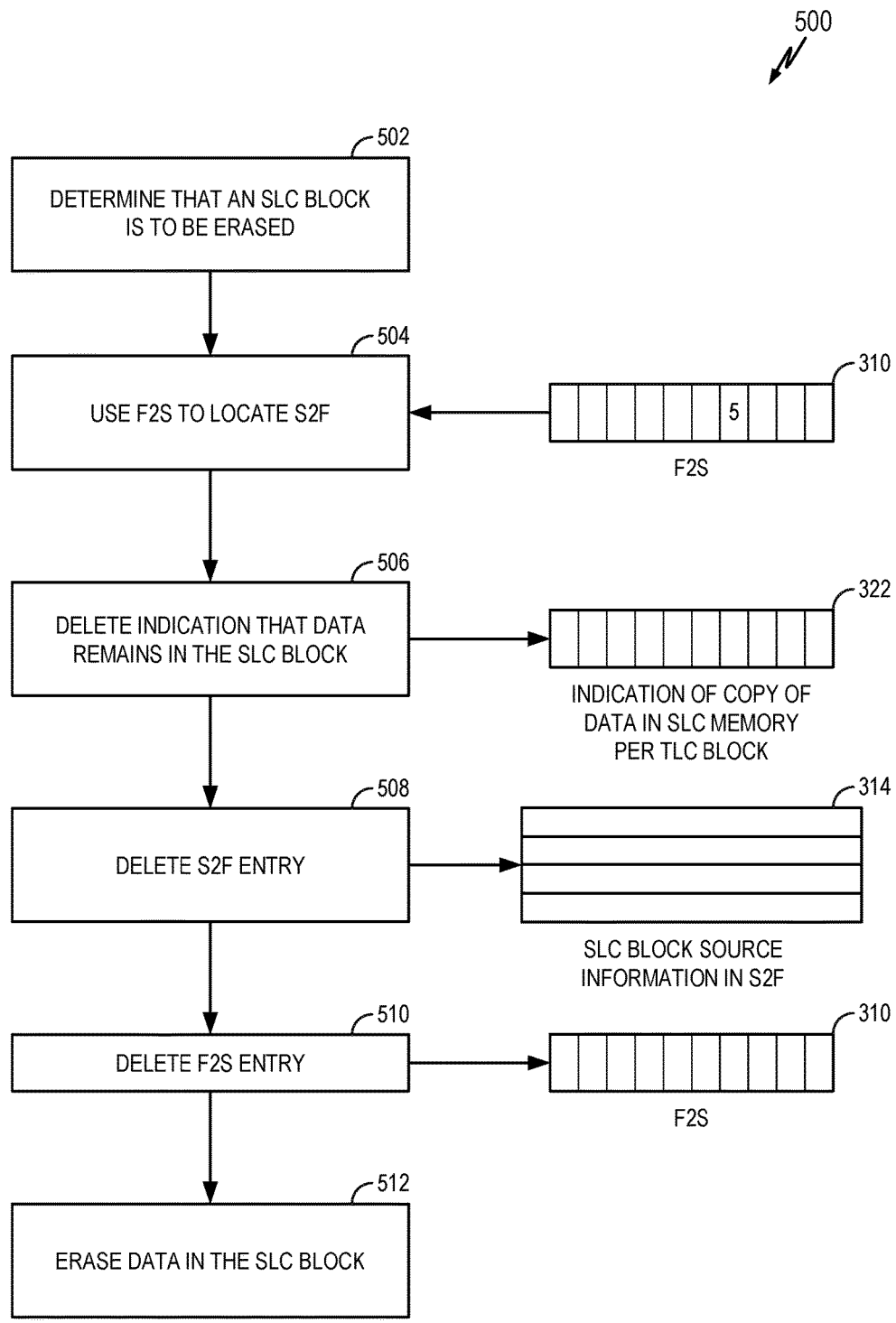
FIG. 5 illustrates an example erase operation in accordance with one or more aspects of the disclosure.

FIG. 5 illustrates an embodiment of operations 500 that may be performed in conjunction with erasing data from an SLC block of a multi-tier memory as in the examples of FIGS. 3 and 4. The operations 500 may take place within a processing circuit (e.g., the processing circuit 710 of FIG. 7), which may be located in a controller, an SSD storage device, an SSD drive, a host device, or some other suitable apparatus.

At block 502, an apparatus (e.g., a controller) determines that an SLC block is to be erased. For example, the apparatus may have received a new write request when the SLC memory is close to full.

At block 504, the apparatus uses the F2S structure 310 to locate the entries in the S2F that redirect to the SLC block to be erased.

At block 506, the apparatus deletes the indication 322 that the data remains in the SLC block.

At block 508, the apparatus deletes the appropriate entries in the S2F structure (e.g., the SLC source information 314).

At block 510, the apparatus deletes the F2S entry 310.

At block 512, the apparatus erases the data in the SLC block of interest.

Example Data Storage Device

Figure 6:
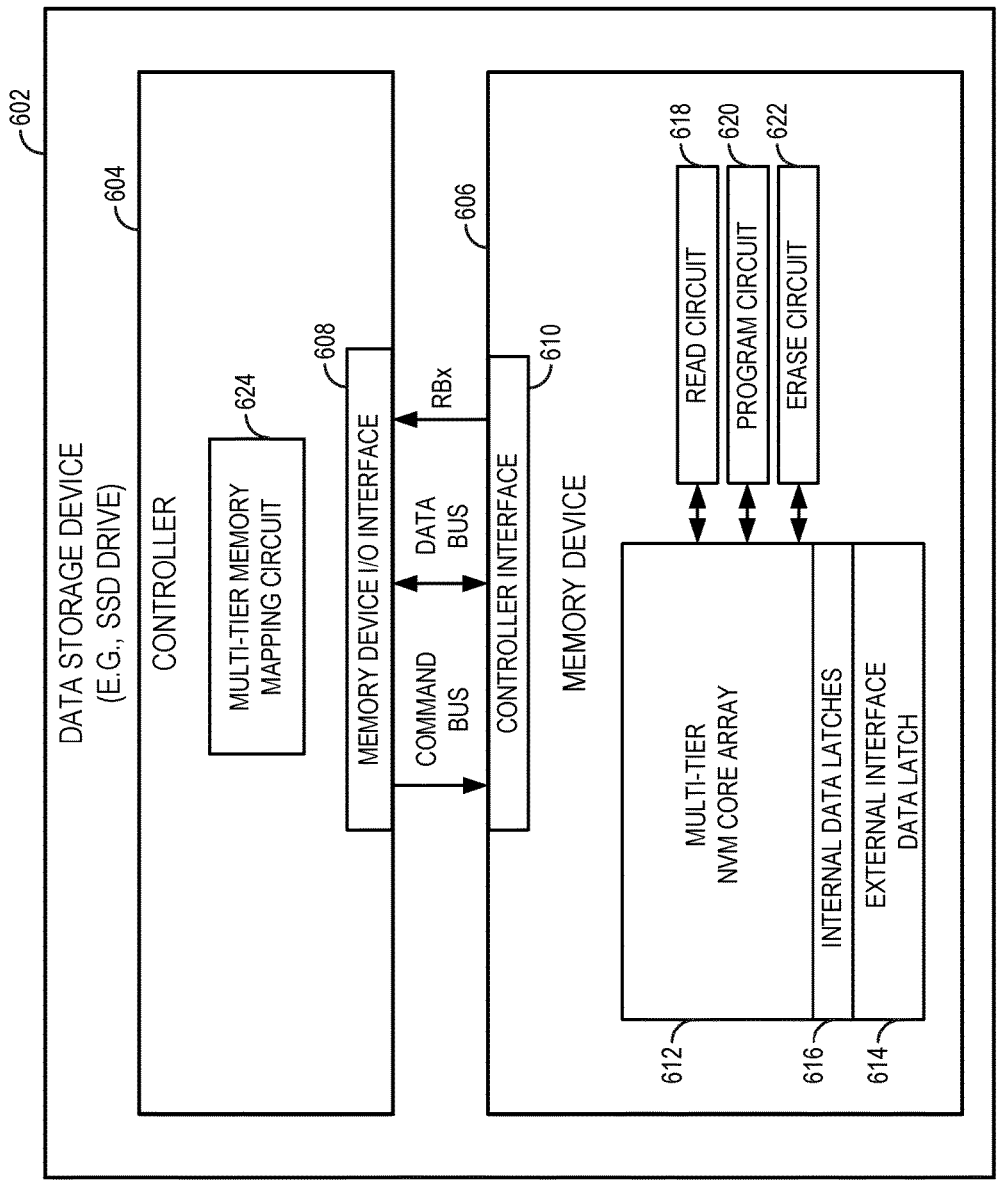
FIG. 6 illustrates an example data storage device configured in accordance with one or more aspects of the disclosure.

FIG. 6 illustrates an embodiment of a data storage device 602 (e.g., an SSD drive) that may perform multi-tier memory mapping as taught herein. The data storage device includes a controller 604 that writes data to and reads data from a memory device 606 (e.g., an NVM), and performs other associated data storage operations.

The controller 604 and the memory device 606 communicate with one another via corresponding interfaces. The controller 604 includes a memory device input/output (I/O) interface 608 for sending commands to the memory device (e.g., via a command bus), sending data to and receiving data from the memory device 606 (e.g., via a data bus), and for sending and receiving other signaling as applicable (e.g., a read/busy indication (RBx) generated by the memory device 606). Similarly, the memory device 606 includes a controller interface 610 for receiving commands from the controller 604 (e.g., via a command bus), sending data to and receiving data from the controller 604 (e.g., via a data bus), and for sending and receiving other signaling as applicable (e.g., RBx).

The memory device 606 includes a multi-tier NVM core array 612 for storing data, an external interface data latch 614 for outputting stored data to and receiving data to be stored from the controller interface 610, and a set of internal data latches 616 for storing operational data that is used by the memory device 606. The memory device 606 also includes a read circuit 618 for reading data from the multi-tier NVM core array 612, a program circuit 620 for writing data to the multi-tier NVM core array 612, and an erase circuit 622 for erasing data in the multi-tier NVM core array 612.

In accordance with the teachings herein, the controller 604 includes a multi-tier memory mapping circuit 624 that may be configured to perform any of the operations and maintain any of the information described herein. For example, the multi-tier memory mapping circuit 624 may correspond to the multi-tier memory mapping circuit 114 of FIG. 1 and perform any of the operations and mapping described herein in conjunction with FIGS. 1-5 and 7-11.

Example Apparatus

Figure 7:
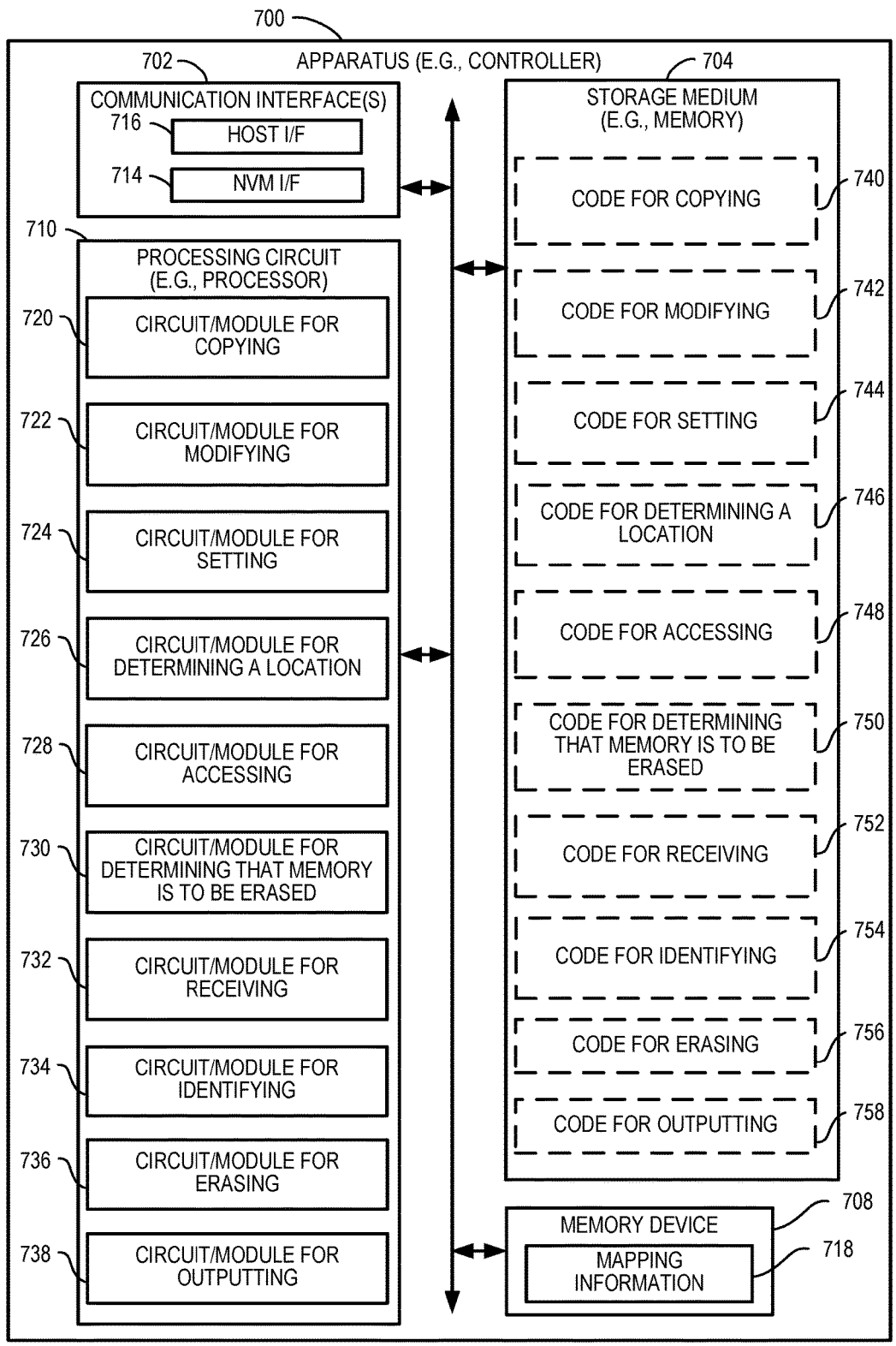
FIG. 7 illustrating an example hardware implementation for an apparatus (e.g., an electronic device) for controlling data storage in accordance with one or more aspects of the disclosure.

FIG. 7 illustrates an embodiment of an apparatus 700 configured to communicate according to one or more aspects of the disclosure. The apparatus 700 could embody or be implemented within a memory controller, an SSD storage device, an SSD drive, a host device, or some other type of device that supports data storage. In various implementations, the apparatus 700 could embody or be implemented within a computing device, a personal computer, a portable device, or workstation, a server, a personal digital assistant, a digital camera, a digital phone, an entertainment device, a medical device, or any other electronic device that stores data.

The apparatus 700 includes a communication interface 702, a storage medium 704, a memory device (e.g., a memory circuit) 708, and a processing circuit 710 (e.g., at least one processor). These components can be coupled to and/or placed in electrical communication with one another via a signaling bus or other suitable component, represented generally by the connection lines in FIG. 7. The signaling bus may include any number of interconnecting buses and bridges depending on the specific application of the processing circuit 710 and the overall design constraints. The signaling bus links together various circuits such that each of the communication interface 702, the storage medium 704, and the memory device 708 are coupled to and/or in electrical communication with the processing circuit 710. The signaling bus may also link various other circuits (not shown) such as timing sources, peripherals, voltage regulators, and power management circuits, which are well known in the art, and therefore, will not be described any further.

The communication interface 702 provides a means for communicating with other apparatuses over a transmission medium. In some implementations, the communication interface 702 includes circuitry and/or programming adapted to facilitate the communication of information bi-directionally with respect to one or more devices in a system. In the example of FIG. 7, the communication interface includes a non-volatile memory interface (I/F) 714 and a host interface (I/F) 716. In some implementations, the communication interface 702 may be configured for wire-based communication. For example, the communication interface 702 could be a bus interface, a send/receive interface, or some other type of signal interface including drivers, buffers, or other circuitry for outputting and/or obtaining signals (e.g., outputting signal from and/or receiving signals into an integrated circuit). The communication interface 702 serves as one example of a means for receiving and/or a means for outputting.

The memory device 708 may represent one or more memory devices. As indicated, the memory device 708 may maintain mapping information 718 along with other information used by the apparatus 700. In some implementations, the memory device 708 and the storage medium 704 are implemented as a common memory component. The memory device 708 may also be used for storing data that is manipulated by the processing circuit 710 or some other component of the apparatus 700.

The storage medium 704 may represent one or more computer-readable, machine-readable, and/or processor-readable devices for storing programming, such as processor executable code or instructions (e.g., software, firmware), electronic data, databases, or other digital information. The storage medium 704 may also be used for storing data that is manipulated by the processing circuit 710 when executing programming. The storage medium 704 may be any available media that can be accessed by a general purpose or special purpose processor, including portable or fixed storage devices, optical storage devices, and various other mediums capable of storing, containing or carrying programming.

By way of example and not limitation, the storage medium 704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 704 may be embodied in an article of manufacture (e.g., a computer program product). By way of example, a computer program product may include a computer-readable medium in packaging materials. In view of the above, in some implementations, the storage medium 704 may be a non-transitory (e.g., tangible) storage medium. For example, the storage medium 704 may be a non-transitory computer-readable medium storing computer-executable code, including code to perform operations as described herein.

The storage medium 704 may be coupled to the processing circuit 710 such that the processing circuit 710 can read information from, and write information to, the storage medium 704. That is, the storage medium 704 can be coupled to the processing circuit 710 so that the storage medium 704 is at least accessible by the processing circuit 710, including examples where at least one storage medium is integral to the processing circuit 710 and/or examples where at least one storage medium is separate from the processing circuit 710 (e.g., resident in the apparatus 700, external to the apparatus 700, distributed across multiple entities, etc.).

Programming stored by the storage medium 704, when executed by the processing circuit 710, causes the processing circuit 710 to perform one or more of the various functions and/or process operations described herein. For example, the storage medium 704 may include operations configured for regulating operations at one or more hardware blocks of the processing circuit 710, as well as to utilize the communication interface 702 for wireless communication utilizing their respective communication protocols.

The processing circuit 710 is generally adapted for processing, including the execution of such programming stored on the storage medium 704. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 710 is arranged to obtain, process and/or send data, control data access and storage, issue commands, and control other desired operations. The processing circuit 710 may include circuitry configured to implement desired programming provided by appropriate media in at least one example. For example, the processing circuit 710 may be implemented as one or more processors, one or more controllers, and/or other structure configured to execute executable programming Examples of the processing circuit 710 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 710 may also be implemented as a combination of computing components, such as a combination of a controller and a microprocessor, a number of microprocessors, one or more microprocessors in conjunction with an ASIC and a microprocessor, or any other number of varying configurations. These examples of the processing circuit 710 are for illustration and other suitable configurations within the scope of the disclosure are also contemplated.

According to one or more aspects of the disclosure, the processing circuit 710 may be adapted to perform any or all of the features, processes, functions, operations and/or routines for any or all of the apparatuses described herein. For example, the processing circuit 710 may be configured to perform any of the steps, functions, and/or processes described with respect to FIGS. 1-6 and 8-11. As used herein, the term "adapted" in relation to the processing circuit 710 may refer to the processing circuit 710 being one or more of configured, employed, implemented, and/or programmed to perform a particular process, function, operation and/or routine according to various features described herein.

The processing circuit 710 may be a specialized processor, such as an application-specific integrated circuit (ASIC) that serves as a means for (e.g., structure for) carrying out any one of the operations described in conjunction with FIGS. 1-6 and 8-11. The processing circuit 710 serves as one example of a means for sending and/or a means for receiving. In various implementations, the processing circuit 710 may provide and/or incorporate, at least in part, the functionality described above for the controller 108 of FIG. 1 or the controller 604 of FIG. 6.

According to at least one example of the apparatus 700, the processing circuit 710 may include one or more of a circuit/module for copying 720, a circuit/module for modifying 722, a circuit/module for setting 724, a circuit/module for determining a location 726, a circuit/module for accessing 728, a circuit/module for determining that memory is to be erased 730, a circuit/module for receiving 732, a circuit/module for identifying 734, a circuit/module for erasing 736, or a circuit/module for outputting 738. In various implementations, the circuit/module for copying 720, the circuit/module for modifying 722, the circuit/module for setting 724, the circuit/module for determining a location 726, the circuit/module for accessing 728, the circuit/module for determining that memory is to be erased 730, the circuit/module for receiving 732, the circuit/module for identifying 734, the circuit/module for erasing 736, or the circuit/module for outputting 738 may provide and/or incorporate, at least in part, the functionality described above for the controller 108 of FIG. 1 or the controller 604 of FIG. 6.

As mentioned above, programming stored by the storage medium 704, when executed by the processing circuit 710, causes the processing circuit 710 to perform one or more of the various functions and/or process operations described herein. For example, the programming may cause the processing circuit 710 to perform the various functions, steps, and/or processes described herein with respect to FIGS. 1-6 and 8-11 in various implementations. As shown in FIG. 7, the storage medium 704 may include one or more of code for copying 740, code for modifying 742, code for setting 744, code for determining a location 746, code for accessing 748, code for determining that memory is to be erased 750, code for receiving 752, code for identifying 754, code for erasing 756, or code for outputting 758. In various implementations, the code for copying 740, the code for modifying 742, the code for setting 744, the code for determining a location 746, the code for accessing 748, the code for determining that memory is to be erased 750, the code for receiving 752, the code for identifying 754, the code for erasing 756, or the code for outputting 758 may be executed or otherwise used to provide the functionality described herein for the circuit/module for copying 720, the circuit/module for modifying 722, the circuit/module for setting 724, the circuit/module for determining a location 726, the circuit/module for accessing 728, the circuit/module for determining that memory is to be erased 730, the circuit/module for receiving 732, the circuit/module for identifying 734, the circuit/module for erasing 736, or the circuit/module for outputting 738.

First Example Process

Figure 8:
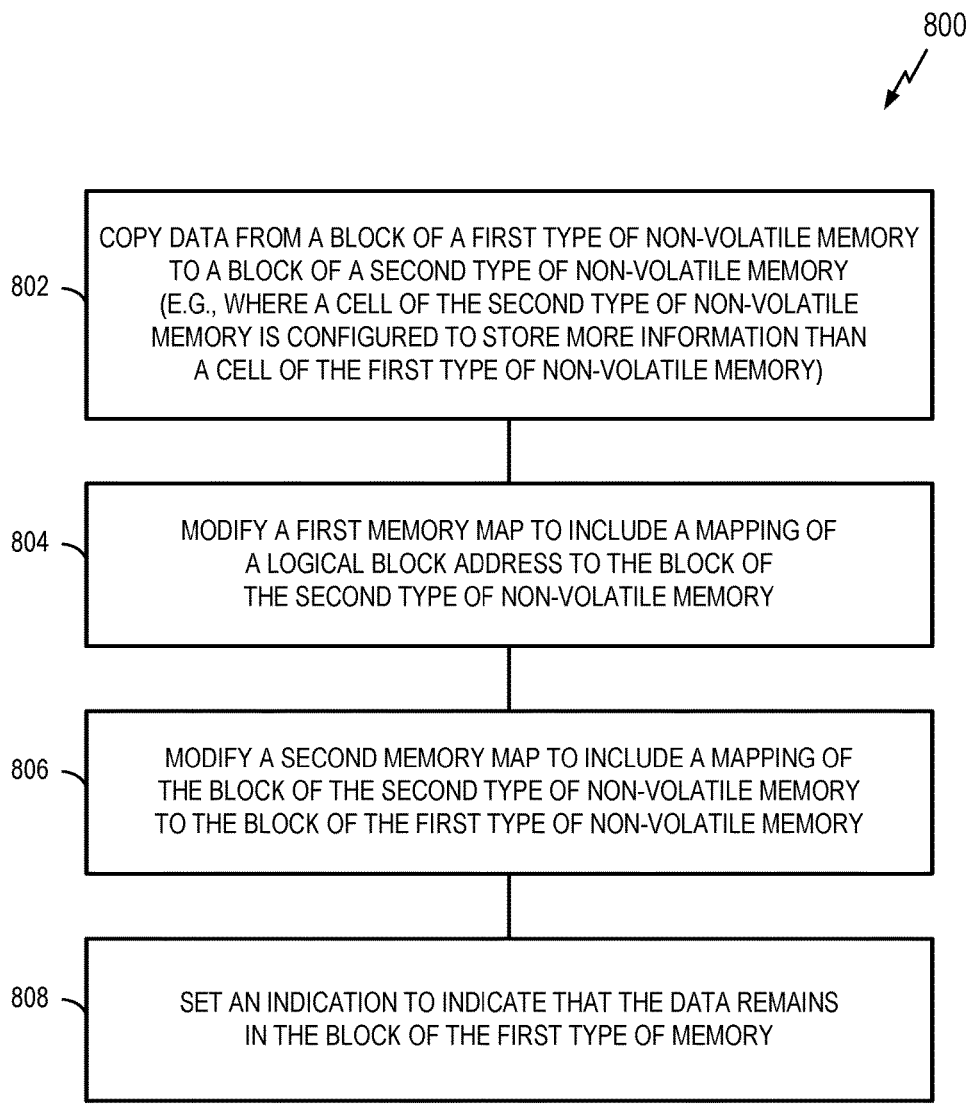
FIG. 8 illustrates an example process for controlling data storage in accordance with one or more aspects of the disclosure.

FIG. 8 illustrates a process 800 for communication in accordance with some aspects of the disclosure. The process 800 may take place within a processing circuit (e.g., the processing circuit 710 of FIG. 7), which may be located in a controller, an SSD storage device, an SSD drive, a host device, or some other suitable apparatus. Of course, in various aspects within the scope of the disclosure, the process 800 may be implemented by any suitable apparatus capable of supporting memory-related operations.

At block 802, an apparatus (e.g., a controller) copies data from a block of a first type of non-volatile memory to a block of a second type of non-volatile memory. In some embodiments, a cell of the second type of non-volatile memory is configured to store more information than a cell of the first type of non-volatile memory. In some embodiments, the copying of the data includes: identifying valid data in the block of the first type of non-volatile memory, and storing the valid data at a range of offsets in the block of the second type of non-volatile memory.

The memory may take different forms in different embodiments. In some embodiments, an access time for the first type of non-volatile memory is faster than an access time for the second type of non-volatile memory. In some embodiments, the first type of non-volatile memory comprises at least one first solid-state memory device, and second type of non-volatile memory comprises at least one second solid-state memory device.

At block 804, the apparatus modifies a first memory map to include a mapping of a logical block address to the block of the second type of non-volatile memory. In some embodiments, the other memory map may include (e.g., may be) a logical to physical memory map that maps logical blocks of a first block size to physical blocks of the first block size, where the first block size is smaller than a block size of the block of the second type of non-volatile memory. For example, the first memory map may be an L2P map. In some embodiments, the modification of the other memory map is performed in conjunction with the copying of block 802. For example, the modification of block 804 may be triggered by the copying of block 802, the modification of block 804 and the copying of block 802 may be triggered together, or these operations may be collaboratively performed in other ways.

At block 806, the apparatus modifies a second memory map to include a mapping of the block of the second type of non-volatile memory to the block of the first type of non-volatile memory. For example, the second memory map may be an S2F map. In some embodiments, the modification of the second memory map may be performed in conjunction with the copying (e.g., triggered by, triggered with, etc.).

The mapping of block 806 may take different forms in different embodiments. In some embodiments, the mapping of the block of the second type of non-volatile memory to the block of the first type of non-volatile memory maps an offset of the copied data into the block of the second type of non-volatile memory to an offset of the data into the block of the first type of non-volatile memory. In some embodiments, the mapping of the block of the second type of non-volatile memory to the block of the first type of non-volatile memory comprises a table including: an identifier of the block of the first type of non-volatile memory, and an offset at which the data was copied into the block of the second type of non-volatile memory. In some embodiments, the mapping of the block of the second type of non-volatile memory to the block of the first type of non-volatile memory further comprises: an offset of the data into the block of the first type of non-volatile memory.

At block 808, the apparatus sets an indication to indicate that the data remains in the block of the first type of non-volatile memory.

In some aspects, a process in accordance with the teachings herein may include any combination of the above operations.

Second Example Process

Figure 9:
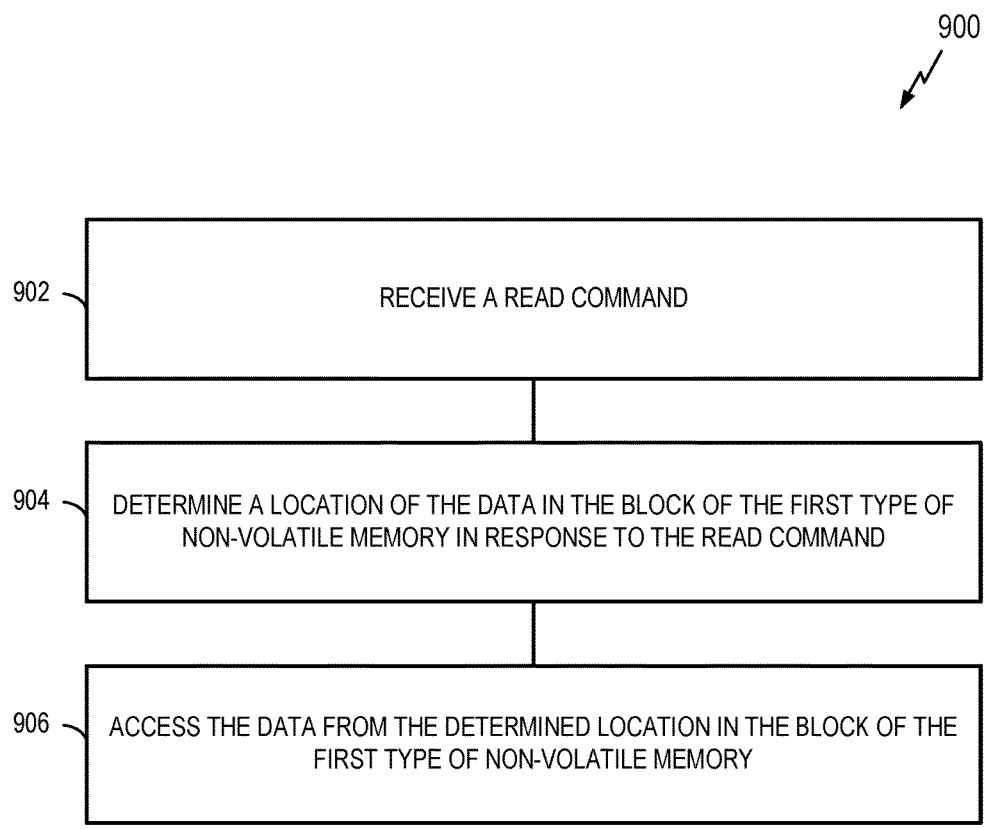
FIG. 9 illustrates an example memory mapping process in accordance with one or more aspects of the disclosure.

FIG. 9 illustrates a process 900 for communication in accordance with some aspects of the disclosure. One or more aspects of the process 900 may be used in conjunction with (e.g., in addition to or as part of) the process 800 of FIG. 8. The process 900 may take place within a processing circuit (e.g., the processing circuit 710 of FIG. 7), which may be located in a controller, an SSD storage device, an SSD drive, a host device, or some other suitable apparatus. Of course, in various aspects within the scope of the disclosure, the process 900 may be implemented by any suitable apparatus capable of supporting memory-related operations.

At block 902, an apparatus (e.g., a controller) receives a read command.

At block 904, the apparatus determines a location of the data in the block of the first type of non-volatile memory in response to the read command In some embodiments, the determination of the location may include determining a location of the offset of the data into the block of the first type of non-volatile memory based on the identifier of the block of the first type of non-volatile memory and the offset at which the data was copied into the block of the second type of non-volatile memory. In some embodiments, the determination of the location may include determining that the read command is directed to a particular block of the second type of non-volatile memory and to a particular offset within the particular block, and identifying an entry of the table based on the particular block and the particular offset. In some embodiments, the determination that the read command is directed to the particular block of the second type of non-volatile memory is based on the first memory map.

At block 906, the apparatus accesses the data from the determined location in the block of the first type of non-volatile memory.

In some aspects, a process in accordance with the teachings herein may include any combination of the above operations.

Third Example Process

Figure 10:
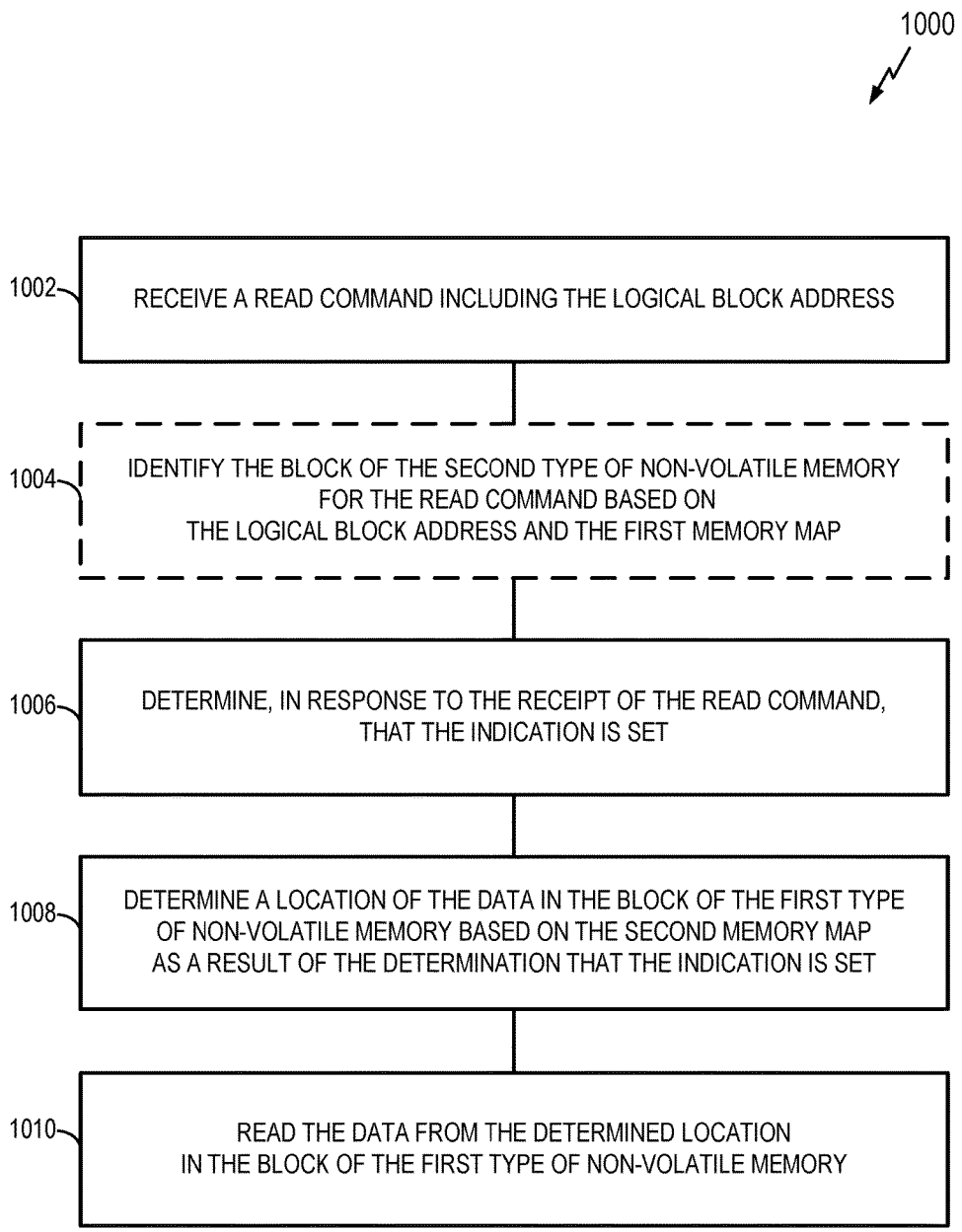
FIG. 10 illustrates another example memory mapping process in accordance with one or more aspects of the disclosure.

FIG. 10 illustrates a process 1000 for communication in accordance with some aspects of the disclosure. One or more aspects of the process 1000 may be used in conjunction with (e.g., in addition to or as part of) the process 800 of FIG. 8. The process 1000 may take place within a processing circuit (e.g., the processing circuit 710 of FIG. 7), which may be located in a controller, an SSD storage device, an SSD drive, a host device, or some other suitable apparatus. Of course, in various aspects within the scope of the disclosure, the process 1000 may be implemented by any suitable apparatus capable of supporting memory-related operations.

At block 1002, an apparatus (e.g., a controller) receives a read command including the logical block address.

At optional block 1004, the apparatus may identify the block of the second type of non-volatile memory for the read command based on the logical block address and the first memory map.

At block 1006, the apparatus determines, in response to the receipt of the read command, that the indication is set.

At block 1008, the apparatus determines a location of the data in the block of the first type of non-volatile memory based on the second memory map as a result of the determination that the indication is set. In some embodiments, the determination of the location may be based on the identified block of the second type of non-volatile memory (block 1004).

At block 1010, the apparatus reads the data from the determined location in the block of the first type of non-volatile memory.

In some aspects, a process in accordance with the teachings herein may include any combination of the above operations.

Fourth Example Process

Figure 11:
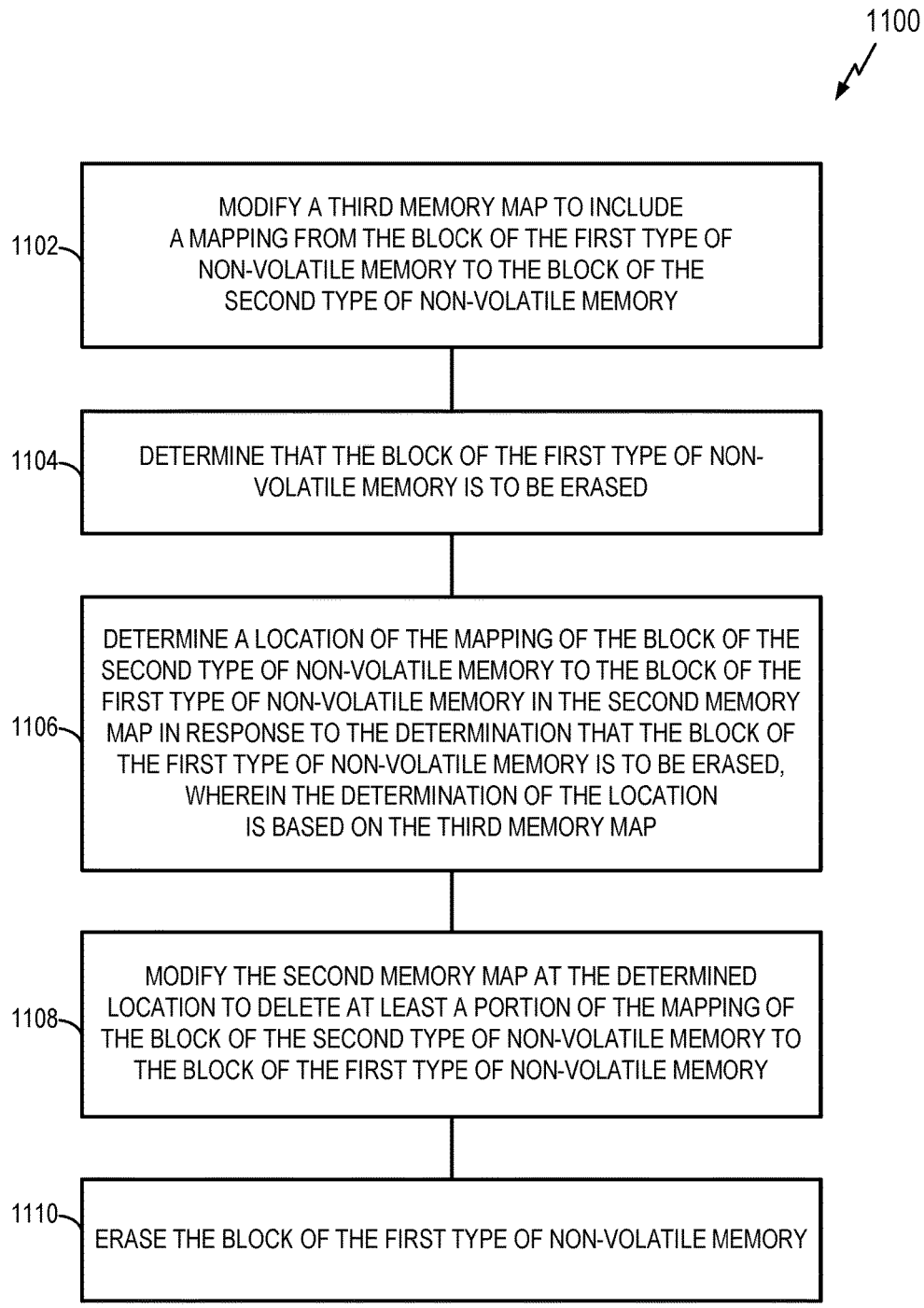
FIG. 11 illustrates an example process for erasing a block of data in accordance with one or more aspects of the disclosure.

FIG. 11 illustrates a process 1100 for communication in accordance with some aspects of the disclosure. One or more aspects of the process 1100 may be used in conjunction with (e.g., in addition to or as part of) the process 800 of FIG. 8. The process 1100 may take place within a processing circuit (e.g., the processing circuit 710 of FIG. 7), which may be located in a controller, an SSD storage device, an SSD drive, a host device, or some other suitable apparatus. Of course, in various aspects within the scope of the disclosure, the process 1100 may be implemented by any suitable apparatus capable of supporting memory-related operations.

At block 1102, an apparatus (e.g., a controller) modifies a third memory map to include a mapping from the block of the first type of non-volatile memory to the block of the second type of non-volatile memory. For example, the third memory map may be an F2S map.

At block 1104, the apparatus subsequently determines that the block of the first type of non-volatile memory is to be erased.

At block 1106, the apparatus determines a location of the mapping of the block of the second type of non-volatile memory to the block of the first type of non-volatile memory in the second memory map in response to the determination that the block of the first type of non-volatile memory is to be erased. In some embodiments, the determination of the location is based on the third memory map.

At block 1108, the apparatus modifies the second memory map at the determined location to delete at least a portion of the mapping of the block of the second type of non-volatile memory to the block of the first type of non-volatile memory.

At block 1110, the apparatus erases the block of the first type of non-volatile memory.

In some aspects, a process in accordance with the teachings herein may include any combination of the above operations.

Other Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage method, comprising:
   copying data from a block of a first type of non-volatile memory to a block of a second type of non-volatile memory, wherein a cell of the second type of non-volatile memory is configured to store more information than a cell of the first type of non-volatile memory;
   modifying a first memory map to include a mapping of a logical block address to the block of the second type of non-volatile memory;
   modifying a second memory map to include a mapping of the block of the second type of non-volatile memory to the block of the first type of non-volatile memory; and
   setting an indication to indicate that the data remains in the block of the first type of non-volatile memory.

2. The method of claim 1, further comprising:
   receiving a read command comprising the logical block address;
   determining, in response to the receipt of the read command, that the indication is set;
   determining a location of the data in the block of the first type of non-volatile memory based on the second memory map as a result of the determination that the indication is set; and
   reading the data from the determined location in the block of the first type of non-volatile memory.

3. The method of claim 2, further comprising:
   identifying the block of the second type of non-volatile memory for the read command based on the logical block address and the first memory map,
   wherein the determination of the location is based on the identified block of the second type of non-volatile memory.

4. The method of claim 1, wherein the mapping of the block of the second type of non-volatile memory to the block of the first type of non-volatile memory maps an offset of the copied data into the block of the second type of non-volatile memory to an offset of the data into the block of the first type of non-volatile memory.

5. The method of claim 1, wherein the mapping of the block of the second type of non-volatile memory to the block of the first type of non-volatile memory comprises a table including:
   an identifier of the block of the first type of non-volatile memory; and an offset at which the data was copied into the block of the second type of non-volatile memory.

6. The method of claim 5, wherein the mapping of the block of the second type of non-volatile memory to the block of the first type of non-volatile memory further comprises:
an offset of the data into the block of the first type of non-volatile memory.

7. The method of claim 6, further comprising determining a location of the data in the block of the first type of non-volatile memory in response to a read command by:
determining a location of the offset of the data into the block of the first type of non-volatile memory based on the identifier of the block of the first type of non-volatile memory and the offset at which the data was copied into the block of the second type of non-volatile memory.

8. The method of claim 5, further comprising determining a location of the data in the block of the first type of non-volatile memory in response to a read command by:
determining that the read command is directed to a particular block of the second type of non-volatile memory and to a particular offset within the particular block; and
identifying an entry of the table based on the particular block and the particular offset.

9. The method of claim 8, wherein the determination that the read command is directed to the particular block of the second type of non-volatile memory is based on the first memory map.

10. The method of claim 1, wherein the copying of the data comprises:
identifying valid data in the block of the first type of non-volatile memory; and
storing the valid data at a range of offsets in the block of the second type of non-volatile memory.

11. The method of claim 1, further comprising:
modifying a third memory map to include a mapping from the block of the first type of non-volatile memory to the block of the second type of non-volatile memory.

12. The method of claim 11, further comprising:
determining that the block of the first type of non-volatile memory is to be erased;
determining a location of the mapping of the block of the second type of non-volatile memory to the block of the first type of non-volatile memory in the second memory map in response to the determination that the block of the first type of non-volatile memory is to be erased, wherein the determination of the location is based on the third memory map;
modifying the second memory map at the determined location to delete at least a portion of the mapping of the block of the second type of non-volatile memory to the block of the first type of non-volatile memory; and
erasing the block of the first type of non-volatile memory.

13. The method of claim 1, wherein:
the first memory map maps logical blocks of a first block size to physical blocks of the first block size; and
the first block size is smaller than a block size of the block of the second type of non-volatile memory.

14. The method of claim 1, wherein an access time for the first type of non-volatile memory is faster than an access time for the second type of non-volatile memory.

15. The method of claim 1, wherein the first memory map and the second memory map are modified as a result of the copying.

16. An apparatus for controlling data storage, comprising:
a first type of non-volatile memory;
a second type of non-volatile memory; and
a processor coupled to the first type of non-volatile memory and the second type of non-volatile memory and configured to:
copy data from a block of a first type of non-volatile memory to a block of a second type of non-volatile memory, wherein a cell of the second type of non-volatile memory is configured to store more information than a cell of the first type of non-volatile memory,
modify a first memory map to include a mapping of a logical block address to the block of the second type of non-volatile memory,
modify a second memory map to include a mapping of the block of the second type of non-volatile memory to the block of the first type of non-volatile memory, and
set an indication to indicate that the data remains in the block of the first type of non-volatile memory.

17. The apparatus of claim 16, wherein the processor is further configured to:
receive a read command comprising the logical block address;
determine, in response to the receipt of the read command, that the indication is set;
determine a location of the data in the block of the first type of non-volatile memory based on the second memory map as a result of the determination that the indication is set; and
read the data from the determined location in the block of the first type of non-volatile memory.

18. The apparatus of claim 17, wherein:
the processor is further configured to identify the block of the second type of non-volatile memory for the read command based on the logical block address and the first memory map; and
the determination of the location is based on the identified block of the second type of non-volatile memory.

19. The apparatus of claim 16, wherein the mapping of the block of the second type of non-volatile memory to the block of the first type of non-volatile memory maps an offset of the copied data into the block of the second type of non-volatile memory to an offset of the data into the block of the first type of non-volatile memory.

20. The apparatus of claim 16, wherein the mapping of the block of the second type of non-volatile memory to the block of the first type of non-volatile memory comprises a table including:
an identifier of the block of the first type of non-volatile memory; and
an offset at which the data was copied into the block of the second type of non-volatile memory.

21. The apparatus of claim 20, wherein the mapping of the block of the second type of non-volatile memory to the block of the first type of non-volatile memory further comprises:
an offset of the data into the block of the first type of non-volatile memory.

22. The apparatus of claim 21, wherein the processor is further configured to determine a location of the data in the block of the first type of non-volatile memory in response to a read command by:
determining a location of the offset of the data into the block of the first type of non-volatile memory based on the identifier of the block of the first type of non-volatile memory and the offset at which the data was copied into the block of the second type of non-volatile memory.

23. The apparatus of claim 20, wherein the processor is further configured to determine a location of the data in the block of the first type of non-volatile memory in response to a read command by:
  determining that the read command is directed to a particular block of the second type of non-volatile memory and to a particular offset within the particular block; and
  identifying an entry of the table based on the particular block and the particular offset.

24. The apparatus of claim 23, wherein the determination that the read command is directed to the particular block of the second type of non-volatile memory is based on the first memory map.

25. The apparatus of claim 16, wherein the copying of the data comprises:
  identifying valid data in the block of the first type of non-volatile memory; and
  storing the valid data at a range of offsets in the block of the second type of non-volatile memory.

26. The apparatus of claim 16, wherein the processor is further configured to:
  modify a third memory map to include a mapping from the block of the first type of non-volatile memory to the block of the second type of non-volatile memory.

27. The apparatus of claim 26, wherein the processor is further configured to:
  determine that the block of the first type of non-volatile memory is to be erased;
  determine a location of the mapping of the block of the second type of non-volatile memory to the block of the first type of non-volatile memory in the second memory map in response to the determination that the block of the first type of non-volatile memory is to be erased, wherein the determination of the location is based on the third memory map;
  modify the second memory map at the determined location to delete at least a portion of the mapping of the block of the second type of non-volatile memory to the block of the first type of non-volatile memory; and
  erase the block of the first type of non-volatile memory.

28. The apparatus of claim 16, wherein:
  the first memory map maps logical blocks of a first block size to physical blocks of the first block size; and
  the first block size is smaller than a block size of the block of the second type of non-volatile memory.

29. The apparatus of claim 16, wherein an access time for the first type of non-volatile memory is faster than an access time for the second type of non-volatile memory.

30. The apparatus of claim 16, wherein the first memory map and the second memory map are modified as a result of the copying.

* * * * *